Feb. 16, 1971

T. O. PAINE
ADMINISTRATOR OF THE NATIONAL AERONAUTICS
AND SPACE ADMINISTRATION
APPARATUS FOR INSPECTING MICROFILM 3,563,668

Filed May 16, 1969

INVENTOR
EUGENE L. KLEIN

BY

ATTORNEYS

INVENTOR
EUGENE L. KLEIN

ATTORNEYS

United States Patent Office 3,563,668
Patented Feb. 16, 1971

3,563,668
APPARATUS FOR INSPECTING MICROFILM
T. O. Paine, Administrator of the National Aeronautics and Space Administration, with respect to an invention of Eugene L. Klein, Cherry Hill, N.J.
Filed May 16, 1969, Ser. No. 825,259
Int. Cl. G01n 21/22
U.S. Cl. 356—203
8 Claims

ABSTRACT OF THE DISCLOSURE

A microfilm inspection apparatus having reels for transporting microfilm over a light box and a rather large magnifying glass for viewing the film for general defects as its moves over the light box. The apparatus has a microscope adjacent the magnifying glass to obtain detail inspection of any particular frame of the film. Also, an electrical densitometer is pivotally mounted so as to swing into contact with the film and thereby obtain an accurate determination of the film density.

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

FIELD OF THE INVENTION

The present invention relates to an inspection apparatus for film and more specifically to an apparatus for semi-automatic inspection of microfilmed documents to insure the proper standards of density, resolution, size and position.

DESCRIPTION OF THE PRIOR ART

Microfilm has been widely adopted as a standard for recording engineering drawings. It is normally necessary that the hundreds of thousands of microfilmed images of drawings be inspected to assure proper image size and position tolerances, resolution requirements, and density restrictions.

Herebefore, microfilm inspection has normally been accomplished manually using an individual microscope, a densitometer, a light box, and hand-cranked wheels. This method of inspection is time consuming, and involves the subjective judgment of the inspector.

SUMMARY OF THE INVENTION

In the present invention, a single apparatus is provided which functionally brings together a microscope, densitometer, light box, and automatic film transport system to achieve an integrated microfilm inspection apparatus. The apparatus has a main housing supporting a motorized forward winding reel and a motorized reverse winding reel for transporting the film. A light box is secured to one side of the housing and idler reels guide the film from the forward and reversed winding reels across its lighted surface. A large magnifying glass is supported in front of the light box so as to view the moving film, and a microscope is pivotally mounted relative to the light box whereby any individual image may be viewed to determine the resolution of the lines. Also, a densitometer is pivotally associated with the light box to obtain film density readings. The densitometer may be electrically connected so as to obtain a direct reading on a meter attached to the front of the housing as well as lights to indicate proper tolerance limits.

Accordingly, it is an object of the present invention to provide an apparatus for easily inspecting the image quality of microfilm.

Another object is to provide an apparatus which is compact in design and readily allows the microfilm to be inspected without damage.

Other objects and advantages of the present invention will become more apparent from the following detailed description when taken in conjunction with the accompanying drawings.

DESCRIPTION OF THE PREFERRED EMBODIMENT

Figure 1:
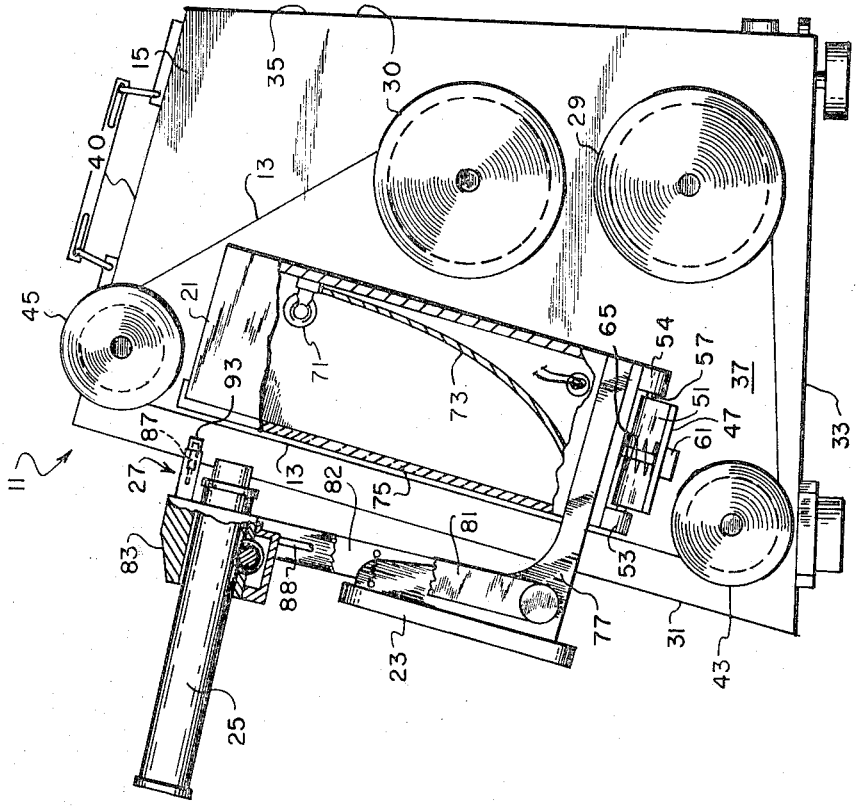
FIG. 1 is a side view of the apparatus according to the present invention, partly in section and portions removed for clarity.
Figure 2:
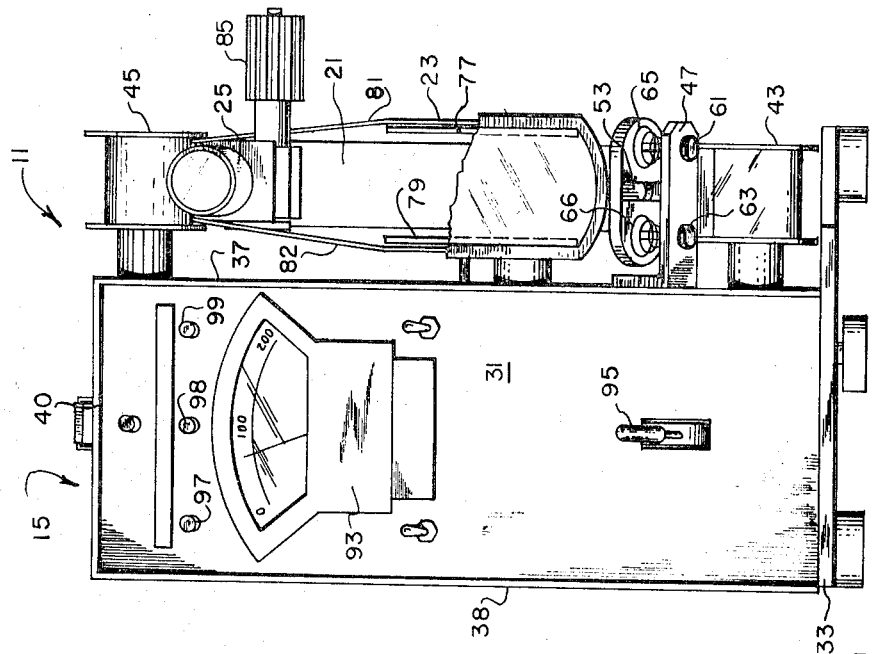
FIG. 2 is a front view of the apparatus.

Referring to the drawings there is shown in FIGS. 1 and 2 an apparatus 11 for inspecting the images on a roll of microfilm 13. The apparatus 11 consists essentially of a main housing 15 having a side mounted light box 21 with a magnifying glass 23, a microscope 25, and a densitometer 27 for inspecting the film 13 transported across the light box 21 by motor driven reels 29 and 30, and also having therein (see FIG. 3) motors 17 and 18 and electrical wiring 19.

Figure 3:
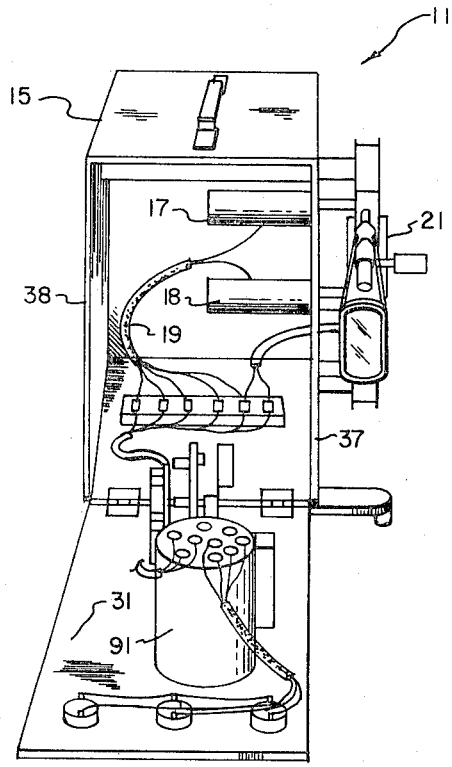
FIG. 3 is a front view of the apparatus with the front panel swung open.

The main housing 15 has an inwardly slanting front panel 31 extending from a horizontal base 33 and a vertical back panel 35 and two vertical side panels 37 and 38. The top panel 40 slopes downwardly slightly from the front to eliminate unnecessary weight and bulkiness and to present a symmetrical appearance relative to the orientation of the light box 21 and microscope 25, etc. Associated with the right side panel 37 at its lower rear is a forward wind reel 29 for microfilm 13 and at its upper rear is a reversed wind reel 30. The forward and reversed wind reels 29 and 30 are each secured to separate motor shafts extending through the side panel. The motors 17 and 18, shown in FIG. 3, are electrically connected whereby tension is maintained on the film 13 as it is being unwound from the reversed wind reel 39 by having the forward wind motor 18 operated to pull the film 13 in one direction and the reversed motor 17 operated in the reversed direction but at a very reduced voltage or torque. This serves to prevent a snare of film, keeps the film firm in its reels, and also prevents scratching of the film surface.

Along right side panel 37 is a lower front shaft with an idler or guide reel 43 and an upper front shaft with a similar idler reel 45, both for guiding the microfilm 13 over the surface of the light box 21.

The light box 21 is supported by a projecting member 47 secured to the right side panel 37. The orientation of the light box 21 and member 47 is such as to enable the operator of the apparatus 11 to easily view and manipulate the inspection devices while facing the front panel 31. As noted the support member 47 slopes downwardly at a slight angle and has an upstanding middle portion 51 to which is hinged the bottom of the light box 21, as illustrated best in FIG. 1. Front and rear lugs 53 and 54 project from the bottom of the light box 21 and extend down on opposite sides of the upstanding middle portion 51. A pin 57 extends through the lugs 53 and 54 and upstanding middle portion 51 so the light box 21 may pivot to the left or right. A pair of screws 61 and 63 are threaded through the member 47, one on each side of the middle portion 51, to serve as a stop for limiting the pivoting movement of the light box 21. A spring 65, 66 encircles each screw and the springs extend between the light box 21 and member 47 to dampen any pivoting motion of the box 21 and to stabilize the box 21 along a vertical axis.

The light box 21 is shown in section in FIG. 1 and has a light 71 mounted on the internal back side of the box 21 at the upper end and a stainless steel reflector 73 curving downward from the light 71 to the bottom of the box 21. The light 71 is placed near the top of the box 21 so as to provide the greatest illumination for the microscope 25 and densitometer 27. A faceplate 75 of milky plastic material is used since it has a finer grain resolution than ground glass and thus makes illumination for the microscope 25 practical without lenses.

A support member 77, 79 is secured to each side of the light box 21 and extends outwardly at an angle corresponding to the slope of the main side support member 47. Each side support member 77 or 79 has an upstanding portion so as to form an L-shaped support. The large magnifying glass 23 of about four power is secured to and extends between the upstanding portions of the side support members 77 and 79 for viewing the film 13 as it is transported across the lighted face 75 of the light box 21.

On each side of the support members 77 and 79, adjacent the bottom of their upstanding portions, is pivotally secured an elongated mount members 81, 82 which extends above the support members 77 and 79. The mount members 81 and 82 are bent inwardly toward each other along their upper halves. A microscope mount 83 extends between and is secured to the two elongated members 81 and 82 adjacent their upper ends. The microscope mount 83 has a knob 85 which is geared to move the microscope barrel 25 to achieve the best focus of the microfilm image.

A tubular member 27 extends from the upper portion of the microscope mount in which is mounted a photocell 87 to serve as the densitometer element. The wiring 88 from the photocell is carried down the inner surface of the mount member 83 to the support member 77 and into the light box 21. The wiring 88 extends from the light box 21 into the housing 15 where is mounted the necessary electrical components 91 to obtain light density readings on a meter 93 mounted on the front panel 31.

In taking film density readings with the photocell 27 the mount supports 81 and 82 are pivoted so as to place the tubular member 27 in contact with the film 13 and to press the film 13 against the milky panel 75 of the light box 21. By this action the effects of the surrounding or ambient light upon the photocell 87 will be minimized and an accurate reading obtained. Also, the film being held firmly by the photocell housing or tubular member 27 will permit a more convenient inspection by the microscope, and time lost in repeated focusing of the microscope is minimized. A flexible rubber O-ring 93 may be fitted to the extremity of the member 27 to seal the contact surface and to prevent scratching of the film emulsion. Also, a suitable photocell selection would be that of the cadmium sulfide type since it has a spectral range approximately that of the human eye.

A suitable electrical circuit (not shown) can be provided within the main housing 15 whereby the forward and reversed reel motors may be regulated by a simple control stick 95 mounted within the front panel 31. The motors 17 and 18 could thus be speeded up or slowed down or even reversed by the action of the operator while viewing the microfilm 13 from the functional related devices described.

Also, the photocell circuitry could be such that three lights 97, 98, 99 mounted in the front panel 31 could give a light signal respecting the light density of the film 13. For example, the left light 97 could go on when the film is too dark, the center light 98 could go on when the film is all right, and the right light 99 could go on when the film is too light.

As previously noted, the light box 21 may be pivoted slightly relative to the housing 15 and principal support 47. Since the microscope mount 83 is also secured to the light housing 21 by the mount members 81 and 82, the operator may cause the microscope 25 to pivot to the left and right relative to the microfilm 13 and thus be able to observe any portions of the image on the film.

Obviously, many modifications and variations of the present invention are possible in light of the above teachings. It is, therefore, to be understood that within the scope of the appended claims the invention may be practiced other than as specifically claimed.

What is claimed is:

1. An apparatus for inspection of microfilm comprising:
   a main housing:
   a light box secured to said housing;
   said light box having a light diffusing front panel;
   means for transporting microfilm across said light diffusing front panel;
   a mount having a photocell;
   means pivotally secured to said mount adjacent said light box so that an operator may press said photocell in contact with the microfilm and thereby obtain an accurate light density reading of the microfilm;
   a microscope secured to said mount;
   a magnifying glass;
   means for securing said magnifying glass so as to view the microfilm transported across said light diffusing panel.

2. An apparatus as defined by claim 1 including:
   a meter secured to the front panel of said main housing for indicating the light reading of said photocell.

3. An apparatus as defined by claim 1 wherein said means for transporting microfilm comprises a forward motor driven wheel and a reversed motor driven reel.

4. An apparatus for inspection of microfilm comprising:
   a housing;
   a support secured to a side of said housing;
   a light box pivotally connected to said support for side-to-side movement;
   spring means tending to stabilize said light box along a vertical axis;
   said light box having an illuminated front panel;
   transporting means for moving a strip of microfilm over and contiguous to the front of said illuminated panel;
   a pair of rigid supports secured to opposite sides and adjacent the bottom of said light box and extending forwardly therefrom;
   a magnifying glass extending between and secured to the outer ends of said rigid supports for easy viewing of the microfilm strip as it is transported across the illuminated front panel;
   a pair of elongated supports each pivotally secured adjacent their lower end to one of said rigid supports at a location forward of the illuminated front panel;
   a mount secured to and extending between said elongated supports adjacent their upper end;
   a microscope adjustably secured to said mount for enabling an operator to inspect the line quality of the images upon the microfilm transported across the illuminated front panel;
   a small housing projecting from said mount toward the illuminated front panel, said small housing including a photocell so that the pivoting of said elongated supports may place the small housing in contact with said microfilm whereby the photocell will obtain an accurate indication of the light density of the microfilm.

5. An apparatus as defined by claim 4 wherein:
   said light box has an internal light bulb and an internal reflector for illuminating the front panel of said light box, said front panel being made of a light diffusion material.

6. An apparatus as defined by claim 5 wherein:

the light bulb in said light box is placed near the top of the light box so as to provide the greatest illumination for the microscope and photocell.

7. An apparatus as defined by claim 4 wherein said transporting means includes:
   a motor driven forward reel and a motor driven reversed reel.

8. An apparatus as defined by claim 7 wherein said transporting means further includes:
   an upper idler reel adjacent and above the illuminated panel of said light box;
   a low idler reel adjacent and below the illuminated panel of said light box, so that a roll of microfilm may be placed on the reversed reel and guided over the upper idler reel and across the face of the illuminated front panel and guided over the lower idler reel to the forward where it will be stored after inspection.

References Cited

UNITED STATES PATENTS

| | | | |
|---|---|---|---|
| 2,413,218 | 12/1946 | Coroniti | 250—219X |
| 3,099,750 | 7/1963 | Swarthout et al. | 250—239 |
| 3,393,602 | 7/1968 | Stouffer | 356—186X |
| 3,473,878 | 10/1969 | Schweitzer | 250—217X |

WALTER STOLWEIN, Primary Examiner

U.S. Cl. X.R.

250—219, 234